(12) United States Patent
Jeon

(10) Patent No.: US 10,694,340 B2
(45) Date of Patent: Jun. 23, 2020

(54) APPARATUS FOR PRODUCING RADIO MAP AND METHOD OF OPERATING SAME

(71) Applicant: SK PLANET CO., LTD., Seongnam-si, Gyeonggi-Do (KR)

(72) Inventor: Jin Ho Jeon, Seongnam-si (KR)

(73) Assignee: SK Planet Co., Ltd., Seongnam-si (KR)

( * ) Notice: Subject to any disclaimer, the term of this patent is extended or adjusted under 35 U.S.C. 154(b) by 0 days.

(21) Appl. No.: 16/555,246

(22) Filed: Aug. 29, 2019

(65) Prior Publication Data

US 2020/0077234 A1   Mar. 5, 2020

(30) Foreign Application Priority Data

Aug. 31, 2018   (KR) .......................... 10-2018-0103953

(51) Int. Cl.
*H04W 4/00*      (2018.01)
*H04W 4/029*     (2018.01)
*H04W 4/024*     (2018.01)
*H04W 4/021*     (2018.01)
*H04W 84/12*     (2009.01)

(52) U.S. Cl.
CPC ............ *H04W 4/029* (2018.02); *H04W 4/021* (2013.01); *H04W 4/024* (2018.02); *H04W 84/12* (2013.01)

(58) Field of Classification Search
CPC ...... H04W 4/029; H04W 4/024; H04W 4/021; H04W 84/12
See application file for complete search history.

(56) References Cited

U.S. PATENT DOCUMENTS

| 2014/0011518 A1* | 1/2014 | Valaee | ................. H04W 64/00 455/456.1 |
| 2015/0223027 A1* | 8/2015 | Ahn | ..................... G01S 5/0236 455/456.1 |
| 2016/0277883 A1* | 9/2016 | Jeon | ................... H04W 52/0212 |
| 2017/0188188 A1* | 6/2017 | Kang | .................... H04W 4/029 |

* cited by examiner

*Primary Examiner* — Khai M Nguyen
(74) *Attorney, Agent, or Firm* — Fenwick & West LLP

(57) ABSTRACT

Disclosed are an apparatus for producing a radio map and a method of operating the same for selecting valid sensing data related to a specific offline store and constructing (producing) a fingerprint radio map of the corresponding offline store.

8 Claims, 10 Drawing Sheets

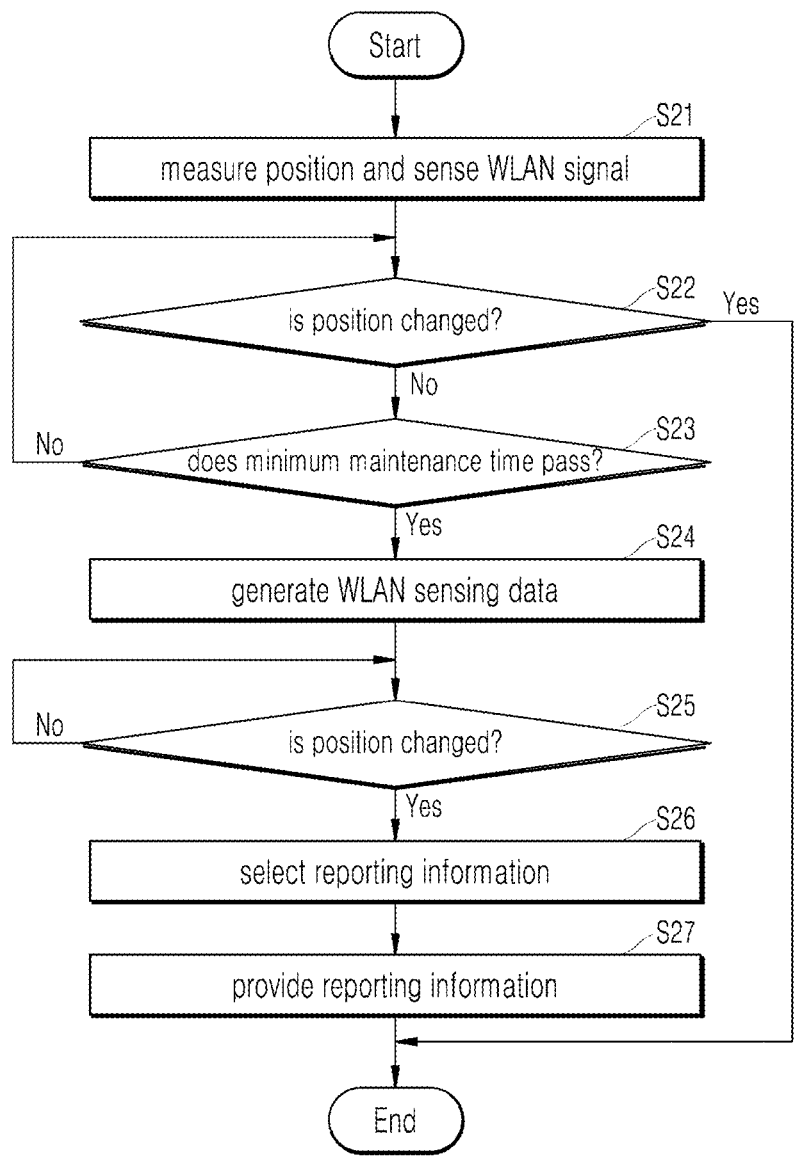

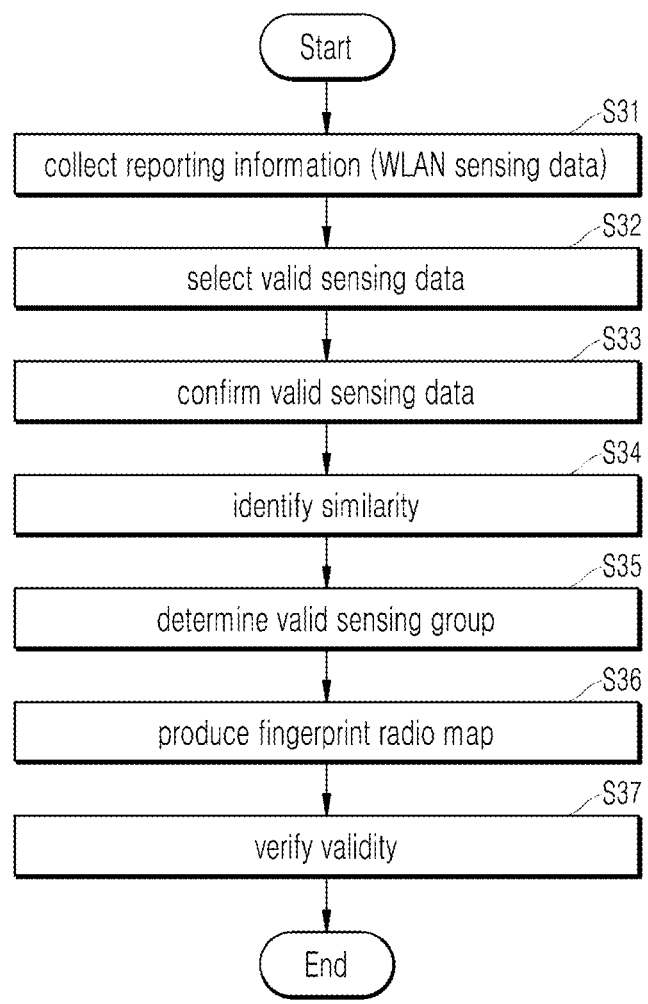

APPARATUS FOR PRODUCING RADIO MAP AND METHOD OF OPERATING SAME

CROSS-REFERENCE TO RELATED APPLICATION

This application is based upon and claims the benefit of priority from Korean Patent Application No. 10-2018-0103953, filed on Aug. 31, 2018, the entire contents of which are incorporated herein by reference.

BACKGROUND OF THE INVENTION

1. Field of the Invention

The present disclosure relates to a technology for selecting valid sensing data related to a specific offline store from WLAN sensing data collected from a plurality of terminal apparatuses (for example, smartphones) and constructing a fingerprint radio map of the specific offline store.

2. Description of the Prior Art

With the development of mobile communication technologies and smart devices, a Location-Based Service (LBS) on the basis of a location has rapidly grown.

Accordingly, a map service for finding a route using a smartphone and a navigation service through a vehicle has come to be frequently used in our lives, and demand for techniques for providing a greater variety of location-based services is increasing.

In general, a location-based service using GPS is provided outdoors, but such a location-based service has vulnerabilities in that positioning accuracy is very low or positioning is impossible in indoor places due to great loss of a satellite signal.

Recently, the percentage of people staying in indoor spaces in their daily lives increases and indoor spaces are becoming larger and more complex, and accordingly, technologies are being actively developed to provide location-based services even in indoor spaces.

In connection with this, many indoor positioning technologies currently used for a smartphone (hereinafter, referred to as a "terminal device") have been researched on the basis of WLAN (Wi-Fi), a sensor, and a beacon, and among these, fingerprinting positioning, which is a WLAN-based indoor positioning scheme, is spotlighted as one of the most accurate technologies.

In WLAN-based fingerprint positioning, a service provider may acquire a WLAN fingerprint on the basis of a WLAN signal transmitted from an indoor or outdoor WLAN AP and link coordinates of locations corresponding to the acquired WLAN fingerprint to construct a fingerprint radio map. When a service subscriber receives a WLAN signal at a predetermined point, the service subscriber may be made aware of the position of the predetermined point with reference to the fingerprint radio map.

To make a fingerprint radio map more reliable, it is necessary to update the fingerprint radio map because the WLAN environment can be changed. However, it takes a lot of effort, time, and expense to construct and update a conventional fingerprint radio map because the construction and the update are all performed manually.

Accordingly, the present disclosure proposes a new method of producing a reliable fingerprint radio map.

SUMMARY OF THE INVENTION

The present disclosure has been made in order to solve the above-mentioned problems in the prior art, and an aspect of the present disclosure is to select valid sensing data related to a specific offline store from WLAN sensing data collected from a plurality of terminal devices (for example, smartphones) and constructing a fingerprint radio map of the corresponding offline store.

In accordance with an aspect of the present disclosure, an apparatus for producing a radio map is provided. The apparatus includes: a processor configured to process calculations related to generation of a fingerprint radio map; and a memory configured to store at least one instruction executed through the processor, wherein the at least one instruction includes: a selection instruction of selecting valid sensing data related to a specific offline store from WLAN sensing data collected from a plurality of terminal devices; a determination instruction of determining, as a valid sensing data group, valid sensing data having similarity larger than or equal to a threshold value based on similarity between the valid sensing data; and a production instruction of producing a fingerprint radio map of the specific offline store based on the valid sensing data determined as the valid sensing data group.

Specifically, the WLAN sensing data may include WLAN name information (Service Set Identifier (SSID)) and WLAN address information (Basic Service Set Identifier (BSSID)), and the selection instruction may select, as valid sensing data, WLAN sensing data having a predefined alias relationship with a name of the specific offline store based on one piece of the WLAN name information and the WLAN address information.

Specifically, the WLAN sensing data may include information on a sensed position at which a WLAN signal is sensed, and the selection instruction may select, as valid sensing data, WLAN sensing data including the information on the sensed position within a valid distance from the position of the specific offline store.

Specifically, the WLAN sensing data may include WLAN address information (a Basic Service Set Identifier (BSSID)), a number of times a WLAN signal is sensed, and a received signal strength (Received Signal Strength Indication (RSSI)) of a WLAN signal, and the similarity between the valid sensing data may be determined according to a result obtained by converting at least one of the number of times the WLAN signal is sensed and the received signal strength into scores based on the WLAN address information.

Specifically, the determination instruction may determine the valid sensing data group according to the result of a Cartesian operation between the valid sensing data based on the score conversion result of the valid sensing data.

In accordance with another aspect of the present disclosure, a method of operating a radio map production device is provided. The method includes: a selection step of selecting valid sensing data related to a specific offline store from WLAN sensing data collected from a plurality of terminal devices; a determination step of determining, as a valid sensing data group, valid sensing data having similarity larger than or equal to a threshold value based on similarity between the valid sensing data; and a production step of producing a fingerprint radio map of the specific offline store based on the valid sensing data determined as the valid sensing data group.

Specifically, the WLAN sensing data may include WLAN name information (a Service Set Identifier (SSID)) and WLAN address information (a Basic Service Set Identifier (BSSID)), and the selection step may select, as valid sensing data, WLAN sensing data having a predefined alias relationship with a name of the specific offline store based on one piece of the WLAN name information and the WLAN address information.

Specifically, the WLAN sensing data may include information on a sensed position at which a WLAN signal is sensed, and the selection step may select, as valid sensing data, WLAN sensing data including the information on the sensed position within a valid distance from the position of the specific offline store.

Specifically, the WLAN sensing data may include WLAN address information (a Basic Service Set Identifier (BSSID)), a number of times a WLAN signal is sensed, and a received signal strength (Received Signal Strength Indication (RSSI)) of a WLAN signal, and the similarity between the valid sensing data may be determined according to a result obtained by converting at least one of the number of times the WLAN signal is sensed and the received signal strength into scores based on the WLAN address information.

Specifically, the determination step may determine the valid sensing data group according to a result of a Cartesian operation between the valid sensing data based on the score conversion result of the valid sensing data.

According to an apparatus for producing a radio map and a method of operating the same according to an embodiment of the present disclosure, it is possible to secure reliability and ease in constructing a fingerprint radio map by selecting valid sensing data related to a specific offline store from WLAN sensing data collected from a plurality of terminal devices (for example, smartphones) and constructing a fingerprint radio map of the corresponding offline store.

BRIEF DESCRIPTION OF THE DRAWINGS

The above and other aspects, features and advantages of the present disclosure will be more apparent from the following detailed description taken in conjunction with the accompanying drawings, in which:

FIG. 9 is a flowchart schematically illustrating operation flow in the terminal device according to an embodiment of the present disclosure; and FIG. 10 is a flowchart schematically illustrating operation flow in the radio map production device according to an embodiment of the present disclosure.

DETAILED DESCRIPTION OF THE EXEMPLARY EMBODIMENTS

Figure 1:
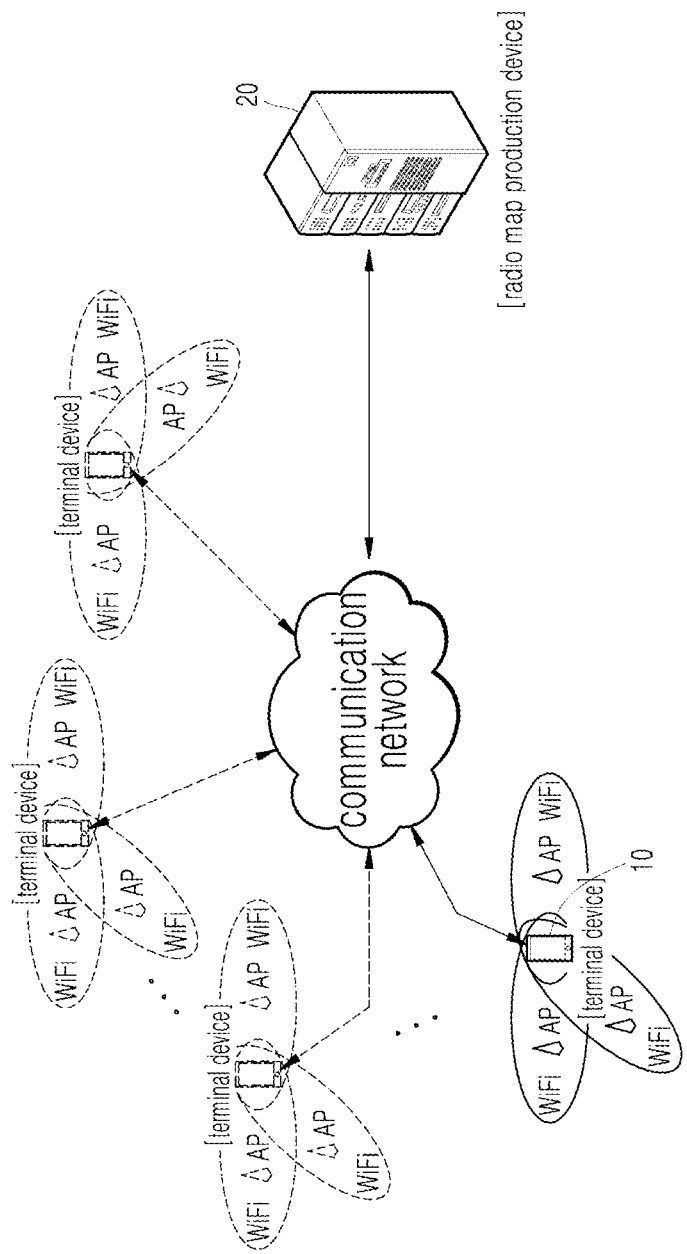
FIG. 1 illustrates the schematic configuration of a fingerprinting positioning system according to an embodiment of the present disclosure.

It should be noted that the technical terms in the specification are merely used for describing a specific embodiment but do not limit the scope of the present disclosure. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

Hereinafter, exemplary embodiments of the present disclosure will be described in detail with reference to the accompanying drawings, equal or similar elements are assigned an equal reference numeral, and an overlapping description thereof will be omitted. Further, in the following description of the present disclosure, a detailed description of known technologies incorporated herein will be omitted when it may make the subject matter of the present disclosure rather unclear. Further, it should be noted that the accompanying drawings are intended only for the easy understanding of the technical idea of the present disclosure, and the spirit of the present disclosure should not be construed as being limited by the accompanying drawings. In addition to the accompanying drawings, the spirit of the present disclosure should be construed to cover all modifications, equivalents, and alternatives thereof.

Hereinafter, an embodiment of the present disclosure will be described with reference to the accompanying drawings.

FIG. 1 illustrates a fingerprint positioning system according to an embodiment of the present disclosure.

As illustrated in FIG. 1, a fingerprinting positioning system according to an embodiment of the present disclosure may include a terminal device 10 configured to report information on a WLAN signal and a radio map production device 20 configured to produce (construct) a Fingerprint Radio Map (FRM) on the basis of the reporting information.

The terminal device 10 is a mobile device having an application installed therein to provide reporting information, and may provide reporting information on a WLAN signal to the radio map production device 20 through the installed application.

The application functions to measure a position through a GPS sensor mounted to the terminal device 10 and to sense (scan for) a WLAN signal (Wi-Fi signal) transmitted from a WLAN AP in the vicinity of the measured position, and may support constant execution of the terminal device 10 in a background.

For reference, the application may be a dedicated application associated with the radio map production device 20 or an application for a separate service within the terminal device 10, but is not limited thereto, and may include any application capable of measuring the position through the GPS sensor and to sense (scan for) the WLAN signal transmitted from the WLAN AP in the vicinity of the measured position.

The radio map production device 20 is a device configured to produce a fingerprint radio map on the basis of reporting information collected from a plurality of unspecified terminal devices 10.

The radio map production device 20 may be implemented in the form of, for example, a web server, a database server, or a proxy server, or may be implemented as a computerized system through installation of one or more of various pieces of software that allow a network load distribution mechanism or a service device to operate over the Internet or another network. Further, the network may be an http network, a private line, an intranet, or another network, and a connection between elements within the fingerprinting positioning system according to an embodiment of the present disclosure may be made through a security network to prevent data from being compromised by an arbitrary hacker or another third party.

The fingerprint positioning system according to the embodiment of the present disclosure may produce the fingerprint radio map on the basis of the reporting information on the WLAN signal through the aforementioned elements.

In other words, the fingerprint positioning system according to the embodiment of the present disclosure may be configured to acquire a WLAN fingerprint on the basis of a WLAN signal transmitted from an indoor or outdoor WLAN AP and to provide a position recognition service environment through a method of constructing a fingerprint radio map by linking the acquired WLAN fingerprint to the coordinates of the corresponding point, and when receiving a WLAN signal at a predetermined point, a service subscriber may be made aware of the position of the corresponding point with reference to the fingerprint radio map through the position recognition service environment.

As briefly mentioned in the prior art, the main issue in the fingerprint positioning-based position recognition service environment is the method of constructing a reliable fingerprint radio map, but it takes a lot of effort, time, and expense to construct and update the conventional fingerprint radio map because the construction and the update are all performed manually.

Accordingly, an embodiment of the present disclosure proposes a method of constructing (producing) a fingerprint radio map of a specific offline store, and, hereinafter, the configuration of the terminal device 10 and the radio map production device 20 will be described in more detail.

Figure 2:
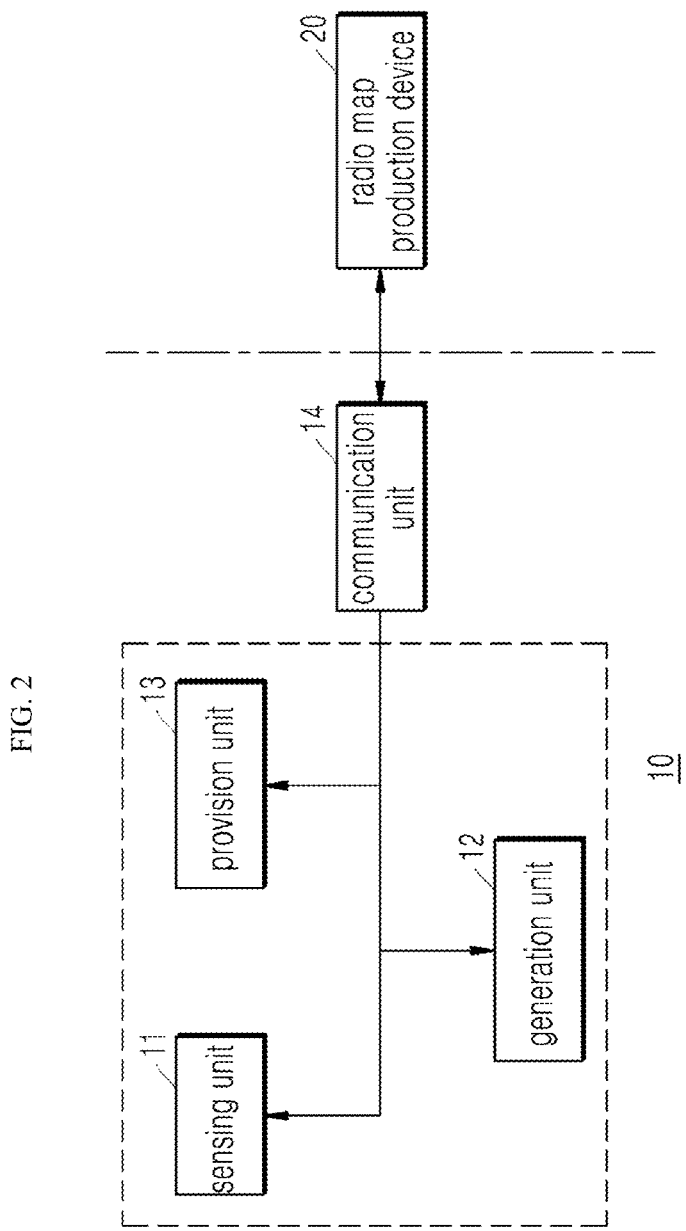
FIG. 2 is a block diagram schematically illustrating a terminal device according to an embodiment of the present disclosure.

FIG. 2 is a block diagram illustrating the terminal device 10 according to an embodiment of the present disclosure.

As illustrated in FIG. 2, the terminal device 10 according to an embodiment of the present disclosure may include a sensing unit 11 configured to sense a WLAN signal, a generation unit 12 configured to generate WLAN sensing data, and a provision unit 13 configured to provide reporting information.

All or at least some of the elements of the terminal device 10 including the sensing unit 11, the generation unit 12, and the provision unit 13 may be implemented in the form of a software (application) module or a hardware module executed by a processor or a combination of the software module and the hardware module.

Particularly, the sensing unit 11 corresponds to an application executed by the terminal device 10 in the background.

Meanwhile, the terminal device 10 according to an embodiment of the present disclosure may further include a communication unit 14 configured to serve an RF function for actual communication with the radio map production device 20 as well as the above-described elements.

For reference, the configuration of the communication unit 14 is the configuration corresponding to a communication unit 1310 described with reference to FIG. 3, and a detailed description thereof will be made below.

As a result, the terminal device 10 according to an embodiment of the present disclosure may select a portion of the WLAN sensing data on the basis of the elements and provide the same as reporting information for producing a fingerprint radio map, and hereinafter, the elements within the terminal device 10 therefor will be described in more detail.

The sensing unit 11 performs a function for sensing a WLAN signal.

More specifically, at a specific position corresponding to a positioning result using a GPS sensor, the sensing unit 11 senses a WLAN signal transmitted from a nearby WLAN AP.

At this time, the sensed WLAN signal includes, for example, information such as a Service Set Identifier (SSID), a Basic Service Set Identifier (BSSID), and a Received Signal Strength Indication (RSSI), and the WLAN signal is logged in a list form along with the measured position.

The generation unit 12 generates a WLAN sensing data for a WLAN signal.

More specifically, the generation unit 12 generates WLAN sensing data for each WLAN signal sensed at a specific position.

However, when there is no position change from the specific position at which the WLAN signal is sensed for a preset minimum maintenance time (for example, 3 minutes), the generation unit 12 may generate WLAN sensing data for each WLAN signal sensed at the corresponding position.

Whether there is a position change from the specific position at which the WLAN signal is sensed may be identified on the basis of the sensing state of the WLAN signal sensed at the corresponding position at every predetermined period.

That is, when the state in which the difference between the WLAN signal sensed in each period and the WLAN signal sensed in the period immediately following the corresponding period is smaller than a threshold value on the basis of the sensing state of the WLAN signal sensed in a predetermined period is maintained for a preset minimum maintenance time (for example, 3 minutes), the generation unit 12 may identify that there is no change in the position from the specific position at which the WLAN signal is sensed and generate WLAN sensing data for each WLAN signal sensed at the corresponding position.

The difference between the WLAN signal sensed in each period and the WLAN signal sensed in the period immediately following the corresponding period indicates that a change in the WLAN signal sensed in each period is detected, that is, a WLAN signal sensed in a specific period is not the same as that in the following period.

Further, generation of the WLAN sensing data may be understood as an operation for storing the WLAN signal logged in the list form in the terminal device 10, and the WLAN sensing data may be generated in the form including information on a sensing position at which the WLAN signal is sensed, WLAN name information (Service Set Identifier (SSID)), WLAN address information (Basic Service Set Identifier (BSSID)), a number of times the WLAN signal is sensed, and a Received Signal Strength Indication (RSSI) of the WLAN signal.

Meanwhile, in connection with the generation of the WLAN sensing data, when the change in the position from the specific position at which the WLAN signal is sensed is identified within a preset minimum maintenance time (for example, 3 minutes), all of the information on the WLAN signal being logged at the corresponding position may be deleted.

As a result, according to an embodiment of the present disclosure, a WLAN signal (from, for example, a mobile AP) that can be temporarily sensed even at the same position may be excluded from WLAN sensing data through the element configured to generate WLAN sensing data for each WLAN signal sensed at the corresponding position only when the change in the position from the specific position at which the WLAN signal is sensed is not identified for a preset minimum maintenance time (for example, 3 minutes), making it possible to secure reliable WLAN sensing data.

The provision unit 13 performs a function for providing reporting information.

More specifically, the provision unit 13 provides at least a portion of the WLAN sensing data generated at the specific position to the radio map production device 20 as reporting information for producing a fingerprint radio map.

At this time, when the position change from the corresponding position is identified after the minimum maintenance time (for example, 3 minutes) passes at the specific position at which the WLAN signal is sensed, the provision unit 13 may provide at least a portion of the generated WLAN sensing data as reporting information for producing the fingerprint radio map.

As the reporting information, N pieces of WLAN sensing data, for which at least one of a number of detections of the WLAN signal and a median of the received signal strength of the WLAN signal is larger than that of other WLAN sensing data, may be selected.

In other words, according to an embodiment of the present disclosure, WLAN sensing data generated at a specific position may be arranged in descending order based on at least one of a number of detections of the WLAN signal and a median of the received signal strength of the WLAN signal, and top N WLAN sensing data of the arranged WLAN sensing data may be selected as reporting information.

Meanwhile, each element within the terminal device 10 may be implemented in the form of a software module or a hardware module executed by the processor or in the form of a combination of a software module and a hardware module.

As described above, the software module and the hardware module executed by the processor, and the combination of the software module and the hardware module may be implemented by a hardware system (for example, a computer system).

Accordingly, hereinafter, a hardware system 1000 in which the terminal device 10 according to an embodiment of the present disclosure is implemented in a hardware form will be described with reference to FIG. 3.

For reference, the following description is an example in which each element within the terminal device 10 is implemented as the hardware system 1000, and it should be noted that each element and the operation thereof may be different from those in an actual system.

Figure 3:
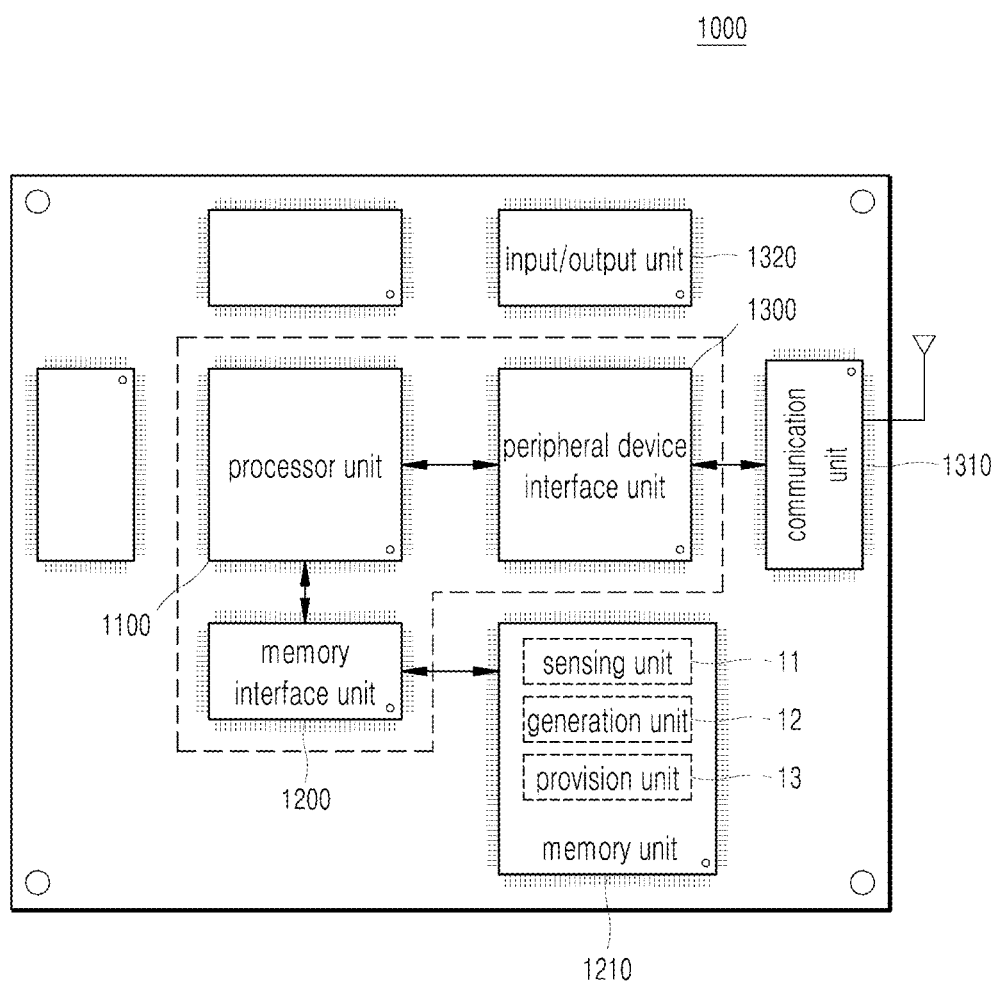
FIG. 3 illustrates a hardware system for implementing the terminal device according to an embodiment of the present disclosure.

As illustrated in FIG. 3, the hardware system 1000 according to an embodiment of the present disclosure may include a processor unit 1100, a memory interface unit 1200, and a peripheral device interface unit 1300.

The respective elements within the hardware system 1000 may be individual elements, or may be integrated into one or more integrated circuits, and may be combined by a bus system (not shown).

The bus system is an abstraction indicating one or more individual physical buses, communication lines/interfaces, multi-drop, and/or point-to-point connections connected by bridges, adaptors, and/or controllers as appropriate.

The processor unit 1100 may serve to execute various software modules stored in the memory unit 1210 by communicating with the memory unit 1210 through the memory interface unit 1200 in order to perform various functions in the hardware system.

The memory unit 1210 may store the sensing unit 11, the generation unit 12, and the provision unit 13, which are elements within the terminal device 10 described with reference to FIG. 2, in the form of a software module, and may further store an Operating System (OS).

The operating system (for example, an embedded operating system such as iOS, Android, Darwin, RTXC, LINUX, UNIX, OSX, WINDOWS, or VxWorks) includes various procedures for controlling and managing general system tasks (for example, memory management, storage device control, and power management), an instruction set, a software component, and/or a driver, and serves to facilitate communication between various hardware modules and software modules.

For reference, the memory unit 1210 includes a cache, a main memory, and a secondary memory, but is not limited thereto, and may include a layer structure of the memory. The layer structure of the memory may be implemented through a predetermined combination of, for example, RAM (for example, SRAM, DRAM, or DDRAM), ROM, FLASH, a magnetic and/or optical storage device (for example, a disk drive, a magnetic tape, a Compact Disk (CD), and a Digital Video Disc (DVD)).

The peripheral interface unit 1300 enables communication between the processor unit 1100 and peripheral devices.

The peripheral devices may provide different functions to the hardware system 1000 and may include, for example, a communication unit 1310 and an input/output unit 1320 according to an embodiment of the present disclosure.

The communication unit 1310 serves to provide a function of communication with another device. To this end, the communication unit 1310 may include, for example, an antenna system, an RF transceiver, one or more amplifiers, a tuner, one or more oscillators, a digital signal processor, a CODEC chipset, and a memory, but is not limited thereto, and may include a known circuit for performing the functions thereof The communication protocols supported by the communication unit 1310 may include, for example, Wireless LAN (WLAN), Digital Living Network Alliance (DLNA), Wireless broadband (WiBro), World interoperability for microwave access (WiMAX), Global System for Mobile communication (GSM), Code-Division Multiple Access (CDMA), Code-Division Multiple Access 2000 (CDMA2000), Enhanced Voice-Data Optimized or Enhanced Voice-Data Only (EV-DO), Wideband CDMA (WCDMA), High-Speed Downlink Packet Access (HSDPA), High-Speed Uplink Packet Access (HSUPA), IEEE 802.16, Long-Term Evolution (LTE), Long-Term Evolution-Advanced (LTE-A), Wireless Mobile Broadband Service (WMBS), Bluetooth, Radio Frequency Identification (RFID), Infrared Data Association (IrDA), Ultra-Wideband (UWB), ZigBee, Near Field Communication (NFC), Ultrasound Communication (USC), Visible Light Communication (VLC), Wi-Fi, and Wi-Fi Direct. Wired communication networks may include wired Local Area Network (LAN), wired Wide Area Network (WAN), Power Line Communication (PLC), USB communication, Ethernet, serial communication, and optical fiber/coaxial cable communication, but are not limited thereto, and may include any protocol that can provide a communication environment with another device.

The input/output unit 1320 may serve as a controller for controlling an I/O device linked to other hardware systems, but may serve to control the GPS sensor for positioning the terminal device 10 in an embodiment of the present disclosure.

As a result, each element within the terminal device 10 stored in the memory unit 1210 of the hardware system 1000 according to an embodiment of the present disclosure in the form of a software module may execute an interface with the communication unit 1310 and the input/output unit 1320 via the memory interface unit 1200 and the peripheral device interface unit 1300 in the form of instructions executed by the processor unit 1100, thereby selecting a portion of the WLAN sensing data, and may provide the selected WLAN sensing data as reporting information for producing a fingerprint radio map.

The description of the configuration of the terminal device 10 according to an embodiment of the present disclosure has been completed, and the description of the configuration of the radio map production device 20 will be made below.

Figure 4:
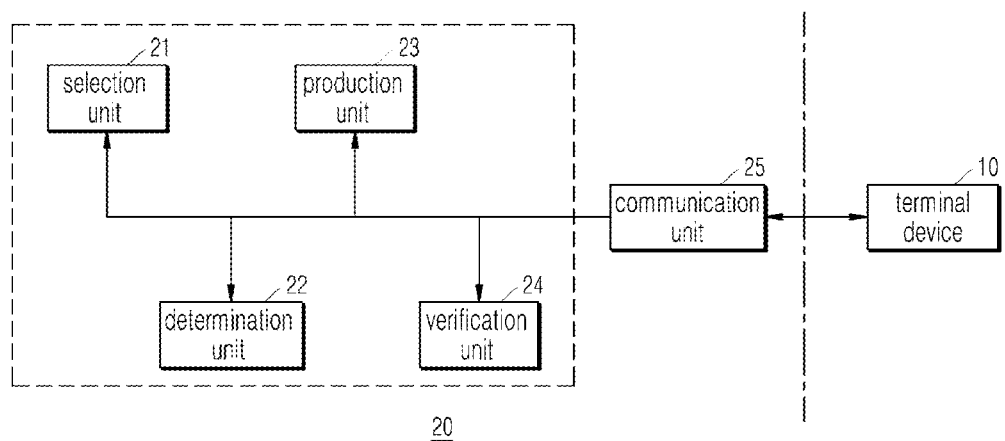
FIG. 4 is a block diagram schematically illustrating a radio map production device according to an embodiment of the present disclosure.

FIG. 4 is a block diagram schematically illustrating the radio map production device 20 according to an embodiment of the present disclosure.

As illustrated in FIG. 4, the radio map production device 20 according to an embodiment of the present disclosure may include a selection unit 21 configured to select valid sensing data, a determination unit 22 configured to determine a valid sensing data group, and a production unit 23 configured to produce a fingerprint radio map.

The radio map production device 20 according to an embodiment of the present disclosure may further include a verification unit 24 configured to verify the validity of a fingerprint radio map as well as the aforementioned elements.

All or at least some of the elements of the radio map production device 20 including the selection unit 21, the determination unit 22, the production unit 23, and the verification unit 24 may be implemented in the form of a software module or a hardware module executed by the processor or a combination of a software module and a hardware module.

The software module may be understood as, for example, instructions executed by the processor that controls calculations within the radio map production device 20, and the instructions may have the form of being installed in a memory within the radio map production device 20.

Meanwhile, the radio map production device 20 according to an embodiment of the present disclosure may further include a communication unit 25, which is an RF module serving to perform actual communication with the terminal device 10, as well as the aforementioned elements.

For reference, the configuration of the communication unit 25 is the configuration corresponding to the communication unit 2310 described with reference to FIG. 7, and thus a detailed description thereof will be made below.

As a result, the radio map production device 20 according to an embodiment of the present disclosure may produce a fingerprint radio map of a specific offline store on the basis of WLAN sensing data collected as reporting information from a plurality of terminal devices 10 according to the aforementioned configuration, and hereinafter, each element within the radio map production device 20 therefor will be described.

The selection unit 21 performs a function for selecting valid sensing data.

More specifically, when WLAN sensing data is collected as reporting information of a plurality of terminal devices 10, the selection unit 21 selects valid sensing data for identifying the specific offline store from the collected WLAN sensing data.

At this time, the selection unit 21 may identify WLAN name information (a Service Set Identifier (SSID)) included in each piece of WLAN sensing data and select, as valid sensing data, WLAN sensing data having a predefined alias relationship with a name of the specific offline store on the basis of the WLAN name information.

To this end, an alias DB for identifying the alias relationship may be constructed in an embodiment of the present disclosure, and the alias DB may match a WLAN name information (for example, starbucks_5G) with a name of the specific offline store (Starbucks) on the basis of, for example, conversion of Korean language to English, transliteration conversion, and Korean language name.

Meanwhile, the selection can be performed using the WLAN address information (Basic Service Set Identifier (BSSID)) as well as the valid sensing data and the WLAN name information.

Further, when the valid sensing data is selected as described above, the selection unit 21 confirms the valid sensing data on the basis of sensed position information within the valid sensing data.

That is, the selection unit 21 identifies sensed position information for each piece of the WLAN sensing data selected as valid sensing data and confirms only WLAN sensing data including information on the sensed position within a valid distance (for example, 100 m) from the position of the specific offline store (latitude/longitude) as the valid sensing data.

The determination unit 22 performs a function for determining a valid sensing data group.

More specifically, when the valid sensing data is confirmed, the determination unit 22 determines valid sensing data having higher reliability among the confirmed valid sensing data as the valid sensing data group.

That is, the WLAN sensing data selected as the valid sensing data may be distributed to the entire space of the specific offline store, and in this case, the WLAN sensing data most frequently collected at a specific position in the specific offline store may have higher reliability.

Accordingly, the determination unit 22 identifies similarity between the valid sensing data and determines valid sensing data having similarity larger than or equal to a threshold value as a valid sensing data group.

At this time, the determination unit 22 may identify similarity between valid sensing data on the basis of a result obtained by converting at least one of the number of detections and the received signal strength into scores based on WLAN address information of each piece of valid sensing data.

That is, the determination unit 22 may determine, as the valid sensing data group, the group having the highest similarity as the valid sensing data group on the basis of a result of the Cartesian operation between valid sensing data based on the score conversion result of the valid sensing data.

Figure 6:
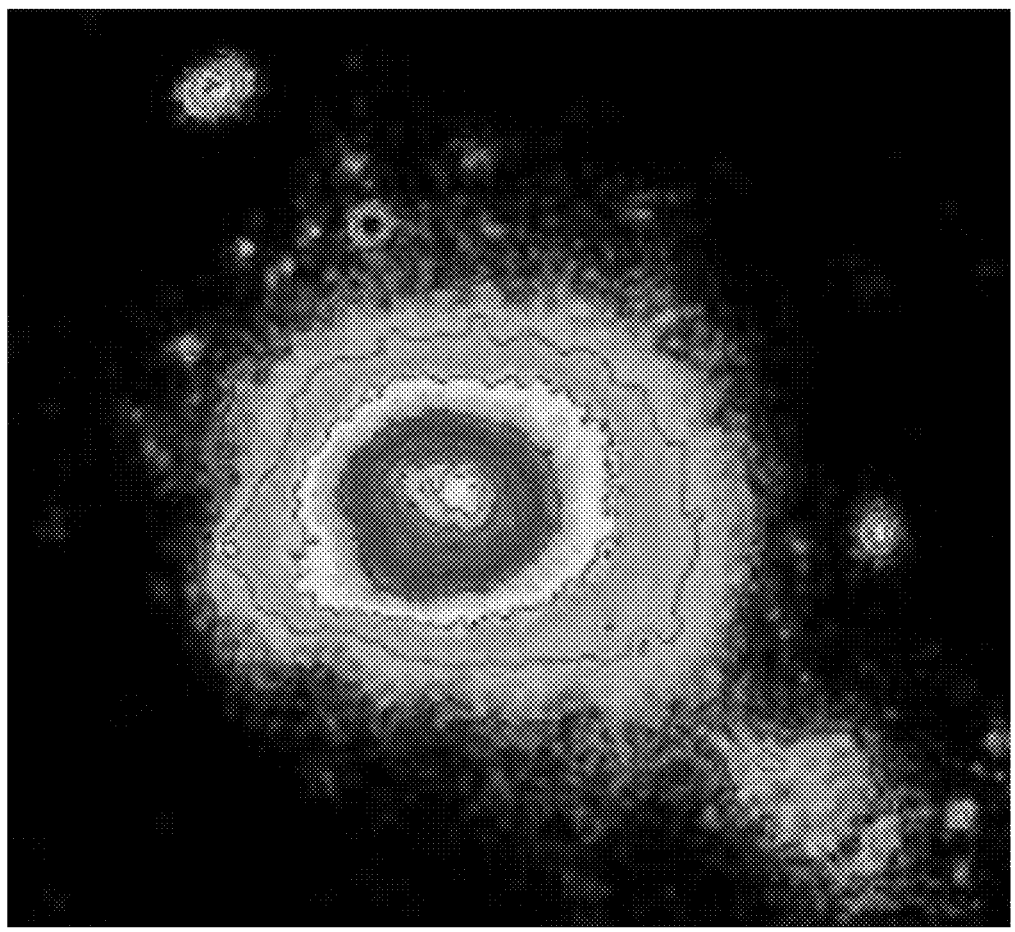
FIG. 6 illustrates valid verification according to an embodiment of the present disclosure.

For example, the valid sensing data group may be, for example, a set of pieces of WLAN sensing data having the highest density as marked by the red color in FIG. 6, which may be understood as the location at which users most frequently stay in the specific offline store.

The production unit 23 performs a function for producing a fingerprint radio map.

More specifically, when the valid sensing data group is determined, the production unit 23 generates a fingerprint radio map of the specific offline store on the basis of the valid sensing data determined as the valid sensing data group.

At this time, the production unit 23 may produce the fingerprint radio map of the specific offline store through a method of linking the valid sensing data determined as the valid sensing data group to coordinates corresponding to sensed position information of each piece of valid sensing data.

The verification unit 24 performs a function for verifying the validity of the fingerprint radio map.

More specifically, when the fingerprint radio map of the specific offline store is produced, the verification unit 24 verifies the validity of the produced fingerprint radio map.

At this time, the verification unit 24 may verify the validity of the fingerprint radio map through a method of detecting a data characteristic of the valid sensing data within the valid sensing data group used for producing the fingerprint radio map.

Figure 5:
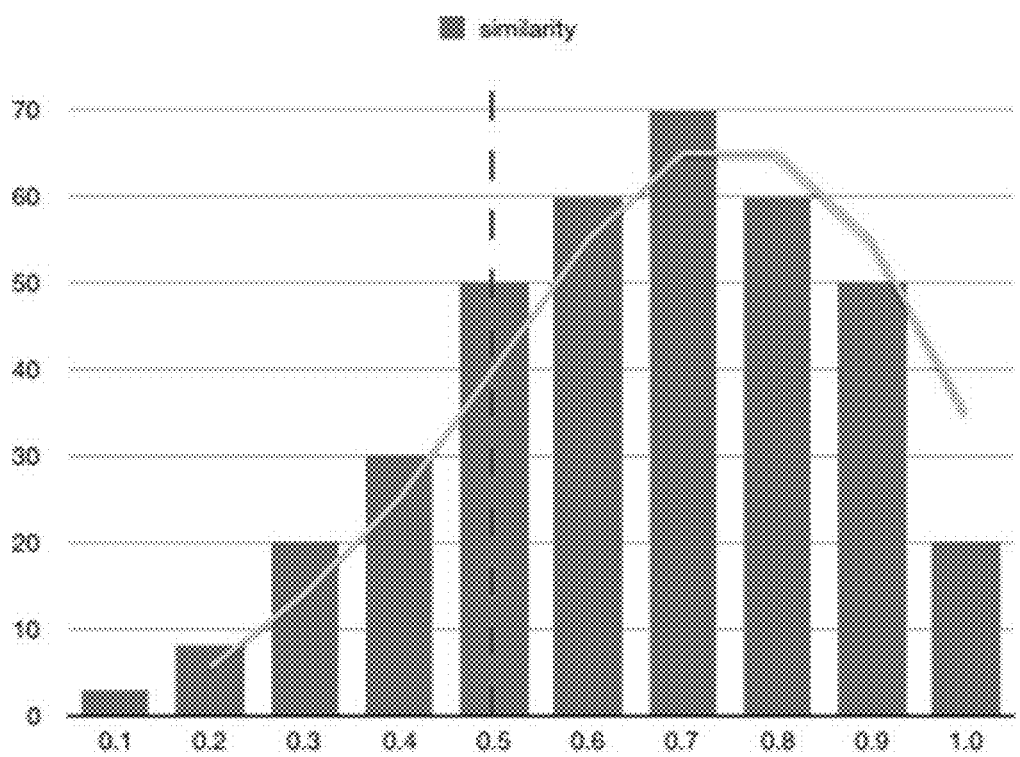
FIG. 5 illustrates a valid sensing group according to an embodiment of the present disclosure.

Specifically, the verification unit 24 may determine the similarity between WLAN (Wi-Fi) pattern information included in the fingerprint radio map and WLAN (Wi-Fi) pattern information of valid sensing data used for producing the fingerprint radio map to generate a list, obtain a histogram on the basis of the similarity list, and, when a median is larger than 0.5, determine that the validity of the produced fingerprint radio map is verified, as illustrated in FIG. 5.

Meanwhile, it has been described that each element within the radio map production device 20 may be implemented in the form of a software module or a hardware module executed by the processor or a combination of the software module and the hardware module.

As described above, the software module and the hardware module executed by the processor and the combination of the software module and the hardware module may be implemented by a hardware system (for example, a computer system).

Accordingly, a hardware system 2000 in which the radio map production device 20 according to an embodiment of the present disclosure is implemented in a hardware form will be described below with reference to FIG. 7.

For reference, the following description is of an example in which each element within the radio map production device 20 is implemented as the hardware system 2000, and it should be noted that each element and the operation thereof may be different from those in an actual system.

Figure 7:
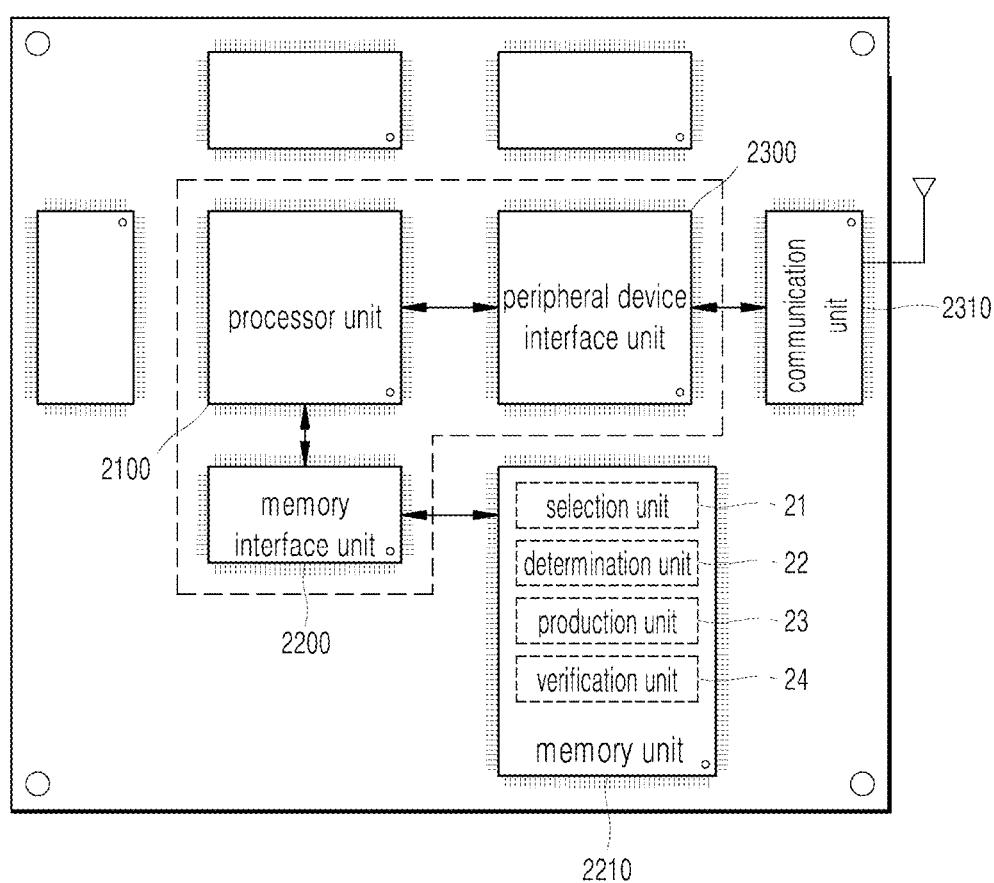
FIG. 7 illustrates a hardware system for implementing a radio map production device according to an embodiment of the present disclosure.

As illustrated in FIG. 7, the hardware system 2000 according to an embodiment of the present disclosure may include a processor unit 2100, a memory interface unit 2200, and a peripheral device interface unit 2300.

The respective elements within the hardware system 2000 may be individual elements, or may be integrated into one or more integrated circuits, and may be combined by a bus system (not shown).

The bus system is an abstraction indicating one or more individual physical buses, communication lines/interfaces, multi-drop, and/or point-to-point connections connected by bridges, adaptors, and/or controllers as appropriate.

The processor unit 2100 may serve to execute various software modules stored in the memory unit 2210 by communicating with the memory unit 2210 through the memory interface unit 2200 in order to perform various functions in the hardware system.

The memory unit 2210 may store the selection unit 21, the determination unit 22, the production unit 23, and the verification unit 24, which are the elements within the radio map production device 20 described with reference to FIG. 4, in the form of a software module, and may further store an Operating System (OS).

The operating system (for example, an embedded operating system such as iOS, Android, Darwin, RTXC, LINUX, UNIX, OSX, WINDOWS, or VxWorks) includes various procedures for controlling and managing general system tasks (for example, memory management, storage device control, and power management), an instruction set, a software component, and/or a driver, and serves to facilitate communication between various hardware modules and software modules.

For reference, the memory unit 2210 includes a cache, a main memory, and a secondary memory, but is not limited thereto, and may include a memory layer structure. The memory layer structure may be implemented through a predetermined combination of, for example, RAM (for example, SRAM, DRAM, or DDRAM), ROM, FLASH, a magnetic and/or optical storage device (for example, a disk drive, a magnetic tape, a Compact Disk (CD), and a Digital Video Disc (DVD)).

The peripheral interface unit 2300 enables communication between the processor unit 2100 and peripheral devices.

The peripheral devices may provide different functions to the hardware system 2000, and may include, for example, a communication unit 2310 according to an embodiment of the present disclosure.

The communication unit 2310 serves to provide a function of communication with another device. To this end, the communication unit 1310 may include, for example, an antenna system, an RF transceiver, one or more amplifiers, a tuner, one or more oscillators, a digital signal processor, a CODEC chipset, and a memory, but is not limited thereto, and may include a known circuit for performing the function.

Communication protocols supported by the communication unit 2310 may include, for example, Wireless LAN (WLAN), Digital Living Network Alliance (DLNA), Wireless broadband (WiBro), World interoperability for microwave access (WiMAX), Global System for Mobile communication (GSM), Code-Division Multiple Access (CDMA), Code-Division Multiple Access 2000 (CDMA2000), Enhanced Voice-Data Optimized or Enhanced Voice-Data Only (EV-DO), Wideband CDMA (WCDMA), High-Speed Downlink Packet Access (HSDPA), High-Speed Uplink Packet Access (HSUPA), IEEE 802.16, Long-Term Evolution (LTE), Long-Term Evolution-Advanced (LTE-A), Wireless Mobile Broadband Service (WMBS), Bluetooth, Radio Frequency Identification (RFID), Infrared Data Association (IrDA), Ultra-Wideband (UWB), ZigBee, Near Field Communication (NFC), Ultrasound Communication (USC), Visible Light Communication (VLC), Wi-Fi, and Wi-Fi Direct. Wired communication networks may include a wired Local Area Network (LAN), a wired Wide Area Network (WAN), Power-Line Communication (PLC), USB communication, Ethernet, serial communication, and optical fiber/coaxial cable communication, but are not limited thereto, and may include any protocol that can provide a communication environment with another device.

As a result, each element within the radio map production device 20 stored in the memory unit 2210 of the hardware system 2000 according to an embodiment of the present disclosure in the form of a software module may execute an interface with the communication unit 2310 via the memory interface unit 2200 and the peripheral device interface unit 2300 in the form of instructions executed by the processor unit 2100, thereby producing the fingerprint radio map of the specific offline store on the basis of WLAN sensing data collected as reporting information from a plurality of terminal devices 10.

As described above, according to the fingerprinting positioning system according to an embodiment of the present disclosure and each element within the system, it is possible to select valid sensing data related to a specific offline store from WLAN sensing data collected from a plurality of terminal devices (for example, smartphones) and produce the fingerprint radio map of the corresponding offline store on the basis of the selected valid sensing data, thereby securing reliability and ease in constructing (producing) the fingerprint radio map.

Hereinafter, the fingerprint positioning system according to an embodiment of the present disclosure and the operation flow of each element within the system will be described.

Figure 8:
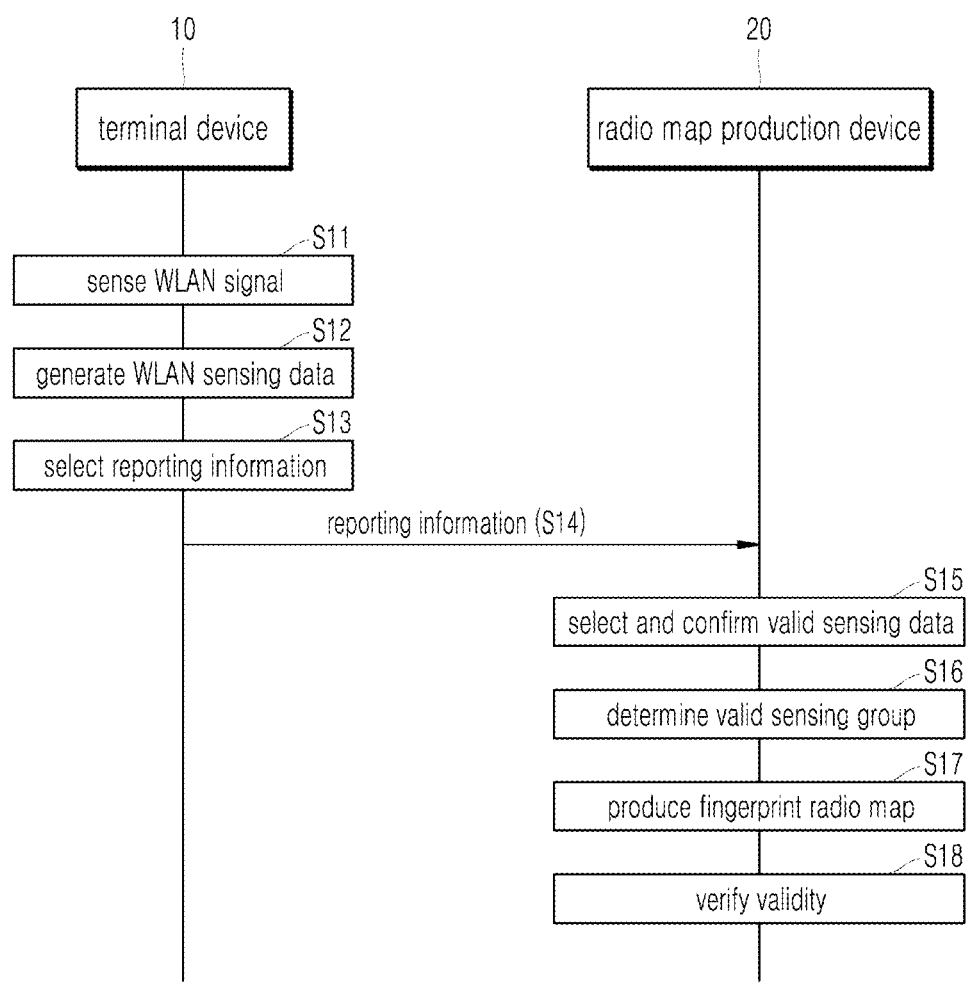
FIG. 8 is a flowchart schematically illustrating operation flow in the fingerprinting positioning system according to an embodiment of the present disclosure.

FIG. 8 illustrates the operation flow in the fingerprinting positioning system according to an embodiment of the present disclosure.

First, the terminal device 10 detects a WLAN signal transmitted from a nearby WLAN AP at a specific position corresponding to a positioning result using a GPS sensor to transmit reporting information in S11.

At this time, the sensed WLAN signal includes, for example, information such as a Service Set Identifier (SSID), a Basic Service Set Identifier (BSSID), and a Received Signal Strength Indication (RSSI), and the WLAN signal is logged in a list form along with the measured position.

The terminal device 10 generates WLAN sensing data for each WLAN signal sensed at the specific position in S12.

At this time, when there is no position change from the specific position at which the WLAN signal is sensed for a preset minimum maintenance time (for example, 3 minutes), the terminal device 10 may generate WLAN sensing data for each WLAN signal sensed at the corresponding position.

Whether there is a position change from the specific position at which the WLAN signal is sensed may be identified on the basis of the sensing state of the WLAN signal sensed at the corresponding position at every period.

That is, when the state in which the difference between the WLAN signal sensed in each period and the WLAN signal sensed in the period immediately following the corresponding period is smaller than a threshold value on the basis of the sensing state of the WLAN signal sensed in a predetermined period is maintained for a preset minimum maintenance time (for example, 3 minutes), the terminal device 10 may identify that there is no change in the position from the specific position at which the WLAN signal is sensed and generate WLAN sensing data for each WLAN signal sensed at the corresponding position.

The difference between the WLAN signal sensed in each period and the WLAN signal sensed in the period immediately following the corresponding period indicates that a change in the WLAN signal sensed in each period is detected, that is, the WLAN signal sensed in a specific period is not the same as that in the following period.

The generation of the WLAN sensing data may be understood to be an operation for storing the WLAN signal, logged in a list form, in the terminal device 10, and the WLAN sensing data may be generated such that the number of detections of the WLAN signal at the corresponding position and the received signal strength indication (RSSI) of the WLAN signal identified at every sensing time match identification information (for example, an SSID or a BSSID) of the WLAN signal sensed at the specific position.

Meanwhile, in connection with the generation of the WLAN sensing data, when the position change from the specific position at which the WLAN signal is sensed is identified within a preset minimum maintenance time (for example, 3 minutes), all of the information on the WLAN signal being logged at the corresponding position may be deleted.

As a result, according to an embodiment of the present disclosure, a WLAN signal (from, for example, a mobile AP) which can be temporarily sensed even at the same position may be excluded from WLAN sensing data through the element configured to generate WLAN sensing data for each WLAN signal sensed at the corresponding position only when the position change from the specific position at which the WLAN signal is sensed is not identified for a preset minimum maintenance time (for example, 3 minutes), making it possible to secure reliable WLAN sensing data.

Subsequently, the terminal device 10 provides at least a portion of the WLAN sensing data generated at the specific position to the radio map production device 20 as reporting information for producing the fingerprint radio map in S13 to S14.

At this time, when the position change from the corresponding position is identified after the minimum maintenance time (for example, 3 minutes) passes at the specific position at which the WLAN signal is sensed, the terminal device 10 may provide at least a portion of the generated WLAN sensing data as reporting information for producing the fingerprint radio map.

When WLAN sensing data is collected as reporting information of a plurality of terminal devices 10, the radio map production device 20 selects valid sensing data for identifying the specific offline store from the collected WLAN sensing data in S15.

At this time, the radio map production device 20 may identify WLAN name information (a Service Set Identifier (SSID)) included in each piece of the WLAN sensing data and select, as valid sensing data, WLAN sensing data having a predefined alias relationship with the name of the specific offline store on the basis of the WLAN name information.

Further, when the valid sensing data is selected as described above, the radio map production device 20 confirms valid sensing data on the basis of sensed position information within the valid sensing data.

That is, the radio map production device 20 identifies sensed position information for each piece of WLAN sensing data selected as the valid sensing data and confirms only WLAN sensing data including information on the sensed position within a valid distance (for example, 100 m) from the position of the specific offline store (latitude/longitude) as the valid sensing data.

When the valid sensing data is confirmed, the radio map production device 20 determines valid sensing data having high reliability among the confirmed valid sensing data as the valid sensing data group in S16.

That is, the WLAN sensing data selected as the valid sensing data may be distributed to the entire space of the specific offline store, and in this case, the WLAN sensing data most frequently collected at a specific position in the specific offline store may have higher reliability.

The radio map production device 20 identifies the similarity between valid sensing data and determines valid sensing data having similarity higher than or equal to a threshold value as the valid sensing data group.

At this time, the radio map production device 20 may identify similarity between valid sensing data on the basis of a result obtained by converting at least one of the number of detections and the received signal strength into scores based on WLAN address information of each piece of valid sensing data.

That is, the radio map production device 20 may determine the group having the highest similarity to be the valid sensing data group on the basis of a result of the Cartesian operation between valid sensing data based on the score conversion result of the valid sensing data.

Subsequently, when the valid sensing data group is determined, the radio map production device 20 produces the fingerprint radio map of the specific offline store on the basis of the valid sensing data determined to be the valid sensing data group in S17.

At this time, the radio map production device 20 may produce the fingerprint radio map of the specific offline store through a method of linking the valid sensing data determined as the valid sensing data group to coordinates corresponding to sensed position information of each piece of valid sensing data.

Thereafter, when the fingerprint radio map of the specific offline store is produced, the radio map production device 20 verifies the validity of the produced fingerprint radio map in S18.

At this time, the radio map production device 20 may determine the similarity between WLAN (Wi-Fi) pattern information included in the fingerprint radio map and WLAN (Wi-Fi) pattern information of valid sensing data used for producing the fingerprint radio map to generate a list, obtain a histogram on the basis of the similarity list, and, when a median is larger than 0.5, determine that the validity of the produced fingerprint radio map is verified, as illustrated in FIG. 5.

The description of the operation flow in the fingerprint positioning system according to an embodiment of the present disclosure has been completed, and the description of the operation flow in the terminal device 10 will be subsequently made.

FIG. 9 illustrates operation flow in the terminal device 10 according to an embodiment of the present disclosure.

First, at a specific position corresponding to a positioning result using a GPS sensor, the sensing unit 11 senses a WLAN signal transmitted from a nearby WLAN AP in S21.

At this time, the sensed WLAN signal includes, for example, information such as a Service Set Identifier (SSID), a Basic Service Set Identifier (BSSID), and a Received Signal Strength Indication (RSSI), and the WLAN signal is logged in a list form along with the measured position.

Subsequently, the generation unit 12 generates WLAN sensing data for each WLAN signal sensed at the specific location in S22 to S24.

At this time, when there is no position change from the specific position at which the WLAN signal is sensed for a preset minimum maintenance time (for example, 3 minutes), the generation unit 12 may generate WLAN sensing data for each WLAN signal sensed at the corresponding position.

Whether there is a position change from the specific position at which the WLAN signal is sensed may be identified on the basis of the sensing state of the WLAN signal sensed at the corresponding position at every period.

That is, when the state in which the difference between the WLAN signal sensed in each period and the WLAN signal sensed in the period immediately following the corresponding period is smaller than a threshold value on the basis of the sensing state of the WLAN signal sensed in a predetermined period is maintained for a preset minimum maintenance time (for example, 3 minutes), the generation unit 12 may identify that there is no change in the position from the specific position at which the WLAN signal is sensed and generate WLAN sensing data for each WLAN signal sensed at the corresponding position.

The difference between the WLAN signal sensed in each period and the WLAN signal sensed in the period immediately following the corresponding period indicates that a change in the WLAN signal sensed in each period is detected, that is, the WLAN signal sensed in a specific period is not the same as that in the following period.

The generation of the WLAN sensing data may be understood as an operation for storing the WLAN signal logged in a list form in the terminal device 10, and the WLAN sensing data may be generated such that the number of detections of the WLAN signal at the corresponding position and the received signal strength indication (RSSI) of the WLAN signal identified at every sensing time match identification information (for example, an SSID or a BSSID) of the WLAN signal sensed at the specific position.

Meanwhile, in connection with the generation of the WLAN sensing data, when the position change from the specific position at which the WLAN signal is sensed is identified within a preset minimum maintenance time (for example, 3 minutes), all of the information on the WLAN signal being logged at the corresponding position may be deleted.

As a result, according to an embodiment of the present disclosure, only when the position change from the specific position at which the WLAN signal is sensed is not identified for a preset minimum maintenance time (for example, 3 minutes), a WLAN signal (from, for example, a mobile AP) which can be temporarily sensed even at the same position may be excluded from WLAN sensing data through the element configured to generate WLAN sensing data for each WLAN signal sensed at the corresponding position, making it possible to secure reliable WLAN sensing data.

Further, the provision unit 13 provides at least a portion of the WLAN sensing data generated at the specific position to the radio map production device 20 as reporting information for producing the fingerprint radio map in S25 to S27.

At this time, when the position change from the corresponding position is identified after the minimum maintenance time (for example, 3 minutes) passes at the specific position at which the WLAN signal is sensed, the provision unit 13 may provide at least a portion of the generated WLAN sensing data as reporting information for producing the fingerprint radio map.

As the reporting information, N pieces of WLAN sensing data for which at least one of a number of detections of the WLAN signal and a median of received signal strengths of the WLAN signals is larger than that of other WLAN sensing data may be selected from among the pre-generated WLAN data.

In other words, according to an embodiment of the present disclosure, WLAN sensing data generated at a specific position may be arranged in descending order based on at least one of the number of detections of the WLAN signal and a median of the received signal strength of the WLAN signal, and top N WLAN sensing data of the arranged WLAN sensing data may be selected as reporting information.

The description of the operation flow in the terminal device 10 according to an embodiment of the present disclosure has been completed, and the description of the operation flow in the radio map production device 20 will be subsequently made.

FIG. 10 illustrates operation flow in the radio map production device 20 according to an embodiment of the present disclosure.

First, when WLAN sensing data is collected as reporting information of a plurality of terminal devices 10, the selection unit 21 selects valid sensing data for identifying the specific offline store from the collected WLAN sensing data in S31 to S32.

At this time, the selection unit 21 may identify WLAN name information (a Service Set Identifier (SSID)) included in each piece of the WLAN sensing data and select, as valid sensing data, WLAN sensing data having a predefined alias relationship with the name of the specific offline store on the basis of the WLAN name information.

To this end, an alias DB for identifying the alias relationship may be constructed in an embodiment of the present disclosure, and the alias DB may match WLAN name information (for example, starbucks_5G) with the name of the specific offline store (Starbucks) on the basis of, for example, conversion of Korean language to English, transliteration conversion, and Korean language name.

Meanwhile, the selection can be performed using the WLAN address information (Basic Service Set Identifier (BSSID)) as well as the valid sensing data and the WLAN name information.

When the valid sensing data is selected as described above, the selection unit 21 confirms valid sensing data on the basis of sensed position information within the valid sensing data in S33.

That is, the selection unit 21 identifies sensed position information for each piece of WLAN sensing data selected as the valid sensing data and confirms only WLAN sensing data including information on the sensed position within a valid distance (for example, 100 m) from the position of the specific offline store (latitude/longitude) as the valid sensing data.

Subsequently, when the valid sensing data is confirmed, the determination unit 22 determines valid sensing data having high reliability among the confirmed valid sensing data as a valid sensing data group in S34 to S35.

That is, the WLAN sensing data selected as the valid sensing data may be distributed to the entire space of the specific offline store, in which case the WLAN sensing data most frequently collected at a specific position in the specific offline store may have higher reliability.

Accordingly, the determination unit 22 identifies the similarity between the valid sensing data and determines valid sensing data having a similarity larger than or equal to a threshold value to be a valid sensing data group.

At this time, the determination unit 22 may identify the similarity between valid sensing data on the basis of a result obtained by converting at least one of the number of detections and the received signal strength into scores based on WLAN address information of each piece of valid sensing data.

That is, the determination unit 22 may determine the group having the highest similarity to be a valid sensing data group based on the result of a Cartesian operation between valid sensing data based on the score conversion result of the valid sensing data.

For example, the valid sensing data group may be, for example, a set of pieces of WLAN sensing data having the highest density, as marked by the red color in FIG. 5, which may be understood to be the location at which users most frequently stay in the specific offline store.

When the valid sensing data group is determined, the production unit 23 produces the fingerprint radio map of the specific offline store on the basis of the valid sensing data determined to be the valid sensing data group in S36.

At this time, the production unit 23 may produce the fingerprint radio map of the specific offline store through a method of linking the valid sensing data determined to be the valid sensing data group to coordinates corresponding to sensed position information of each piece of valid sensing data.

Thereafter, when the fingerprint radio map of the specific offline store is produced, the verification unit 24 verifies the validity of the produced fingerprint radio map in S37.

At this time, the verification unit 24 may verify the validity of the fingerprint radio map through a method of detecting a data characteristic of the valid sensing data within the valid sensing data group used for producing the fingerprint radio map.

Specifically, the verification unit 24 may acquire a similarity between WLAN (Wi-Fi) pattern information included in the fingerprint radio map and WLAN (Wi-Fi) pattern information of valid sensing data used for producing the fingerprint radio map to generate a list, obtain a histogram on the basis of the similarity list, and, when a median is larger than 0.5, determine that the validity of the produced fingerprint radio map is verified, as illustrated in FIG. 7.

As described above, according to the fingerprinting positioning system according to an embodiment of the present disclosure and an operation method of each element within the system, it is possible to select valid sensing data related to a specific offline store from WLAN sensing data collected from a plurality of terminal devices (for example, smartphones) and produce the fingerprint radio map of the corresponding offline store on the basis of the selected valid sensing data, thereby securing reliability and ease in constructing (producing) the fingerprint radio map.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the terms "system" and "device", for example, cover a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. An apparatus for producing a radio map, the apparatus comprising:
    a processor configured to process calculations related to generation of a fingerprint radio map; and
    a memory configured to store at least one instruction executed through the processor, wherein the at least one instruction comprises:
        a selection instruction of selecting valid sensing data related to a specific offline store from WLAN sensing data collected from a plurality of terminal devices, wherein the WLAN sensing data includes information on a sensed position at which a WLAN signal is sensed;
        a determination instruction of determining, as a valid sensing data group, valid sensing data having similarity larger than or equal to a threshold value based on similarity between the valid sensing data; and
        a production instruction of producing a fingerprint radio map of the specific offline store based on the valid sensing data determined as the valid sensing data group,
    wherein the selection instruction selects, as the valid sensing data, the WLAN sensing data including the information on the sensed position within a valid distance from a position of the specific offline store.

2. The apparatus of claim 1, wherein the WLAN sensing data includes WLAN name information and WLAN address information and
    the selection instruction selects, as the valid sensing data, WLAN sensing data having a predefined alias relationship with a name of the specific offline store based on one piece of the WLAN name information and the WLAN address information.

3. The apparatus of claim 1, wherein the WLAN sensing data includes WLAN address information, a number of times a WLAN signal is sensed, and a received signal strength of a WLAN signal, and
    the similarity between the valid sensing data is determined according to a result obtained by converting at least one of the number of times the WLAN signal is sensed and the received signal strength into scores based on the WLAN address information.

4. The apparatus of claim 3, wherein the determination instruction determines the valid sensing data group according to a result of a Cartesian operation between the valid sensing data based on a score conversion result of the valid sensing data.

5. A method of operating a radio map production device, the method comprising:
    selecting, as valid sensing data related to a specific offline store, WLAN sensing data including information on a sensed position within a valid distance from a position of the specific offline store, the WLAN sensing data collected from a plurality of terminal devices;

determining, as a valid sensing data group, valid sensing data having a similarity larger than or equal to a threshold value based on a similarity between the valid sensing data; and producing a fingerprint radio map of the specific offline store based on the valid sensing data determined as the valid sensing data group.

6. The method of claim 5, wherein the WLAN sensing data includes WLAN name information and WLAN address information, and the selecting comprises:

selecting, as the valid sensing data, WLAN sensing data having a predefined alias relationship with a name of the specific offline store based on one piece of the WLAN name information and the WLAN address information.

7. The method of claim 5, wherein the WLAN sensing data includes WLAN address information, a number of times a WLAN signal is sensed, and a received signal strength of a WLAN signal, and the similarity between the valid sensing data is determined according to a result obtained by converting at least one of the number of times the WLAN signal is sensed and the received signal strength into scores based on the WLAN address information.

8. The method of claim 7, wherein the determining comprises:

determining the valid sensing data group according to a result of a Cartesian operation between the valid sensing data based on a score conversion result of the valid sensing data.

* * * * *